(12) United States Patent
Choi

(10) Patent No.: US 8,305,590 B2
(45) Date of Patent: Nov. 6, 2012

(54) DRIVER OF SERVER MANAGING IMAGE FORMING DEVICE DRIVERS, AND DATA PRINTING METHOD USING THE SAME

(75) Inventor: In-sung Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 879 days.

(21) Appl. No.: 11/480,475

(22) Filed: Jul. 5, 2006

(65) Prior Publication Data

US 2007/0008567 A1    Jan. 11, 2007

(30) Foreign Application Priority Data

Jul. 5, 2005    (KR) .................. 10-2005-0060282

(51) Int. Cl.
*G06F 3/12*    (2006.01)
(52) U.S. Cl. .................. 358/1.13; 358/1.15; 358/1.1
(58) Field of Classification Search .............. 358/1.13, 358/1.15, 1.1
See application file for complete search history.

(56) References Cited

U.S. PATENT DOCUMENTS

| | | | | |
|---|---|---|---|---|
| 5,854,693 A * | 12/1998 | Yoshiura et al. | .............. | 358/468 |
| 6,943,905 B2 * | 9/2005 | Ferlitsch | .............. | 358/1.13 |
| 2002/0083131 A1 * | 6/2002 | Machida | .............. | 709/203 |
| 2004/0061729 A1 * | 4/2004 | Green et al. | .............. | 347/5 |
| 2004/0085572 A1 * | 5/2004 | Gomez | .............. | 358/1.15 |
| 2004/0190052 A1 * | 9/2004 | Sando | .............. | 358/1.15 |
| 2004/0218212 A1 * | 11/2004 | Jang et al. | .............. | 358/1.15 |
| 2005/0039193 A1 * | 2/2005 | Choi et al. | .............. | 719/321 |

FOREIGN PATENT DOCUMENTS

| | | |
|---|---|---|
| CN | 1550973 | 12/2004 |
| JP | 2001-075758 | 3/2001 |
| JP | 2001-202214 | 7/2001 |
| JP | 2002-108580 | 4/2002 |
| KR | 2004-84535 | 10/2004 |

OTHER PUBLICATIONS

Office Action issued in Chinese Patent Application No. 2006101322968 on Aug. 31, 2007.

* cited by examiner

*Primary Examiner* — Benny Q Tieu
*Assistant Examiner* — Martin Mushambo
(74) *Attorney, Agent, or Firm* — Staas & Halsey LLP

(57) ABSTRACT

A driver of a server managing a plurality of image forming device drivers and a data printing method using the same are provided. The virtual driver includes an object information storage part for storing image forming device information to provide object information and objects of the image forming devices; an object information register for registering new object information and corresponding image forming device information in the object information storage part by searching another new object different from the objects stored in the object information storage part when the image forming device is connected to the server, and then a new object is found by recognizing the connection; a user interface unit for displaying the object information stored in the object information storage part when the client device requests a data output; and a job controller for outputting print data to the image forming device providing the object when the object is selected through the user interface unit.

12 Claims, 9 Drawing Sheets

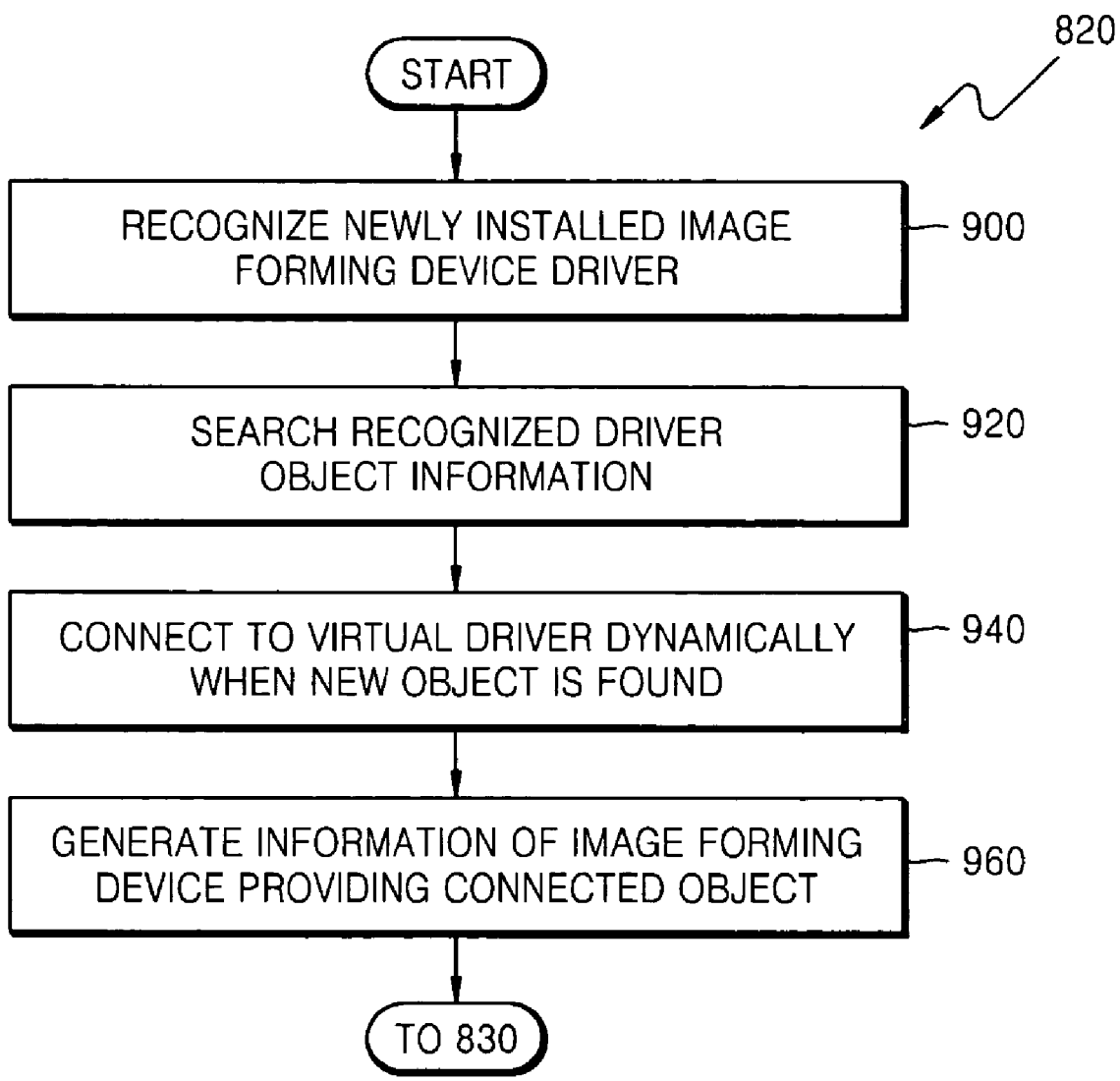

DRIVER OF SERVER MANAGING IMAGE FORMING DEVICE DRIVERS, AND DATA PRINTING METHOD USING THE SAME

CROSS-REFERENCE TO RELATED PATENT APPLICATIONS

This application claims all benefits accruing under 35 U.S.C. §119 from Korean Application No. 2005-60282, filed Jul. 5, 2005, in the Korean Intellectual Property Office, the disclosure of which is incorporated by reference herein.

BACKGROUND OF THE INVENTION

1. Field of the Invention

The present invention relates to image forming device drivers, and more particularly to a virtual driver of a server managing a plurality of image forming device drivers and a data printing method using the same.

2. Related Art

FIG. 1 is a diagram illustrating a configuration of a typical server-client environment in which a plurality of client computers, a server computer, and a plurality of image forming devices are connected to each other on a network, such as a local area network (LAN) or the Internet. As shown in FIG. 1 the image forming devices represent printers; however, such image forming devices can also be photo-copiers, facsimile machines and multi-functional products. Moreover, the server computer controls functions of a driver of each of the printers using a virtual driver installed therein. At this point, each client computer outputs print data to a selected printer through the virtual driver of the server. Then, the virtual driver is responsible for controlling an output job scheduling process, and the client computer selects only fundamental and common functions provided from the virtual driver and outputs the print data.

More specifically, a printer is connected to the server computer, and then a virtual driver is installed in the server computer. The virtual driver recognizes the installed driver of each printer connected on the network. Then, only a fundamental and common function property of each recognized printer is provided to a user. The client computer controls an output job through the virtual driver. The virtual driver is assigned to each printer using various scheduling methods. Consequently, original functions of each printer are not provided to the user.

As described in connection with FIG. 1, various kinds of printers that also provide various kinds of functions are connected to the server computer in the network. The virtual driver installed on the server computer provides a user with a unified interface for the driver of each printer. Each user of the client computers uses a server printer to print documents. At this point, one unique driver is used to output documents through the virtual driver functions. The virtual driver selects one printer among the connected printers and outputs print data using, for example, a job scheduling method.

The virtual driver only provides fundamental and common functions of the connected printer drivers to a user. The virtual driver cannot provide specific functions such as N-UP, Watermark, Overlay, Poser, Duplex, Toner Save, etc. Consequently, the client computer cannot use specific functions of each printer.

SUMMARY OF THE INVENTION

Various aspects and example embodiments of the present invention provide a driver managing a plurality of image forming device drivers and a data output method. The driver allows users to use all functions provided from each printer and a network printer effectively by dynamically adding different specific functions of each printer to the driver when installing an object on a server computer after creating the object for individual functions of each printer driver.

Additional aspects and/or advantages of the invention will be set forth in part in the description which follows and, in part, will be obvious from the description, or may be learned by practice of the invention.

In accordance with an example embodiment of the present invention, a data printing method of a virtual driver managing a plurality of image forming device drivers in a network is provided where a plurality of image forming devices and at least one client are connected to a server device (server computer). Such a method comprises: creating functions of the image forming device drivers as objects and installing the created objects in the server device; creating and registering information about the installed objects; providing the information about the installed objects to a client requiring an data output; and printing data using the image forming device providing the installed objects when the installed objects are selected by the client.

According to an aspect of the present invention, the information about the installed object may be configured in a script file format. The registering of the information may include recognizing a newly installed image forming device driver, searching for object information of the recognized driver, dynamically connecting the new object to the virtual driver installed in the server when a new object is found in the search, and creating corresponding image forming device information of the connected object.

According to an aspect of the present invention, the information provided may include searching image forming devices providing an object when the object is selected by the client device; and outputting print data through the allocated image forming device by limiting the searched image forming devices to allocate a print job. The method may further include transferring information about the image forming device that outputs data, to the client device to inform a user of the information. The information about the image forming device may include location information of the image forming device and progress status information of a data output.

In accordance with another embodiment of the present invention, there is provided a driver that manages a plurality of image forming device drivers in a network where the plurality of image forming devices and at least one client device are connected to a server device, respectively. Such a driver comprises: an object information storage part for storing image forming device information to provide object information and objects of the image forming devices; an object information register for registering new object information and corresponding image forming device information in the object information storage part by searching another new object different from the objects stored in the object information storage part when the image forming device is connected to the server, and then a new object is found by recognizing the connection; a user interface unit for displaying the object information stored in the object information storage device when the client device requests a data output; and a job controller for outputting print data to the image forming device providing the object when the object is selected through the user interface unit.

According to an aspect of the present invention, the object information register may include an object information search unit searching object information of the image forming device driver when the image forming device is connected to the server device and then is recognized, and a dynamic connection unit registering the object information and corresponding image forming device information when a new object is found in a search result.

According to an aspect of the present invention, the job controller may include an image forming device search unit searching image forming devices to provide the selected objects by searching the object information storage part when the object is selected through the user interface unit, and an output data controller outputting print data through the allocated image forming device by limiting the searched image forming devices to allocate a print job.

According to an aspect of the present invention, the device may include an output information provider informing the client device of information about the image forming device outputting data.

In accordance with yet another embodiment of the present invention, a computer-readable recording medium is provided to record a program executing the present invention in the computer. Alternatively, such a computer readable recording medium may have recorded thereon a program executed by a computer according to the above method.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 9 is a detailed flowchart of operation 820 shown in FIG. 8.

DETAILED DESCRIPTION OF THE EMBODIMENTS

Figure 1:
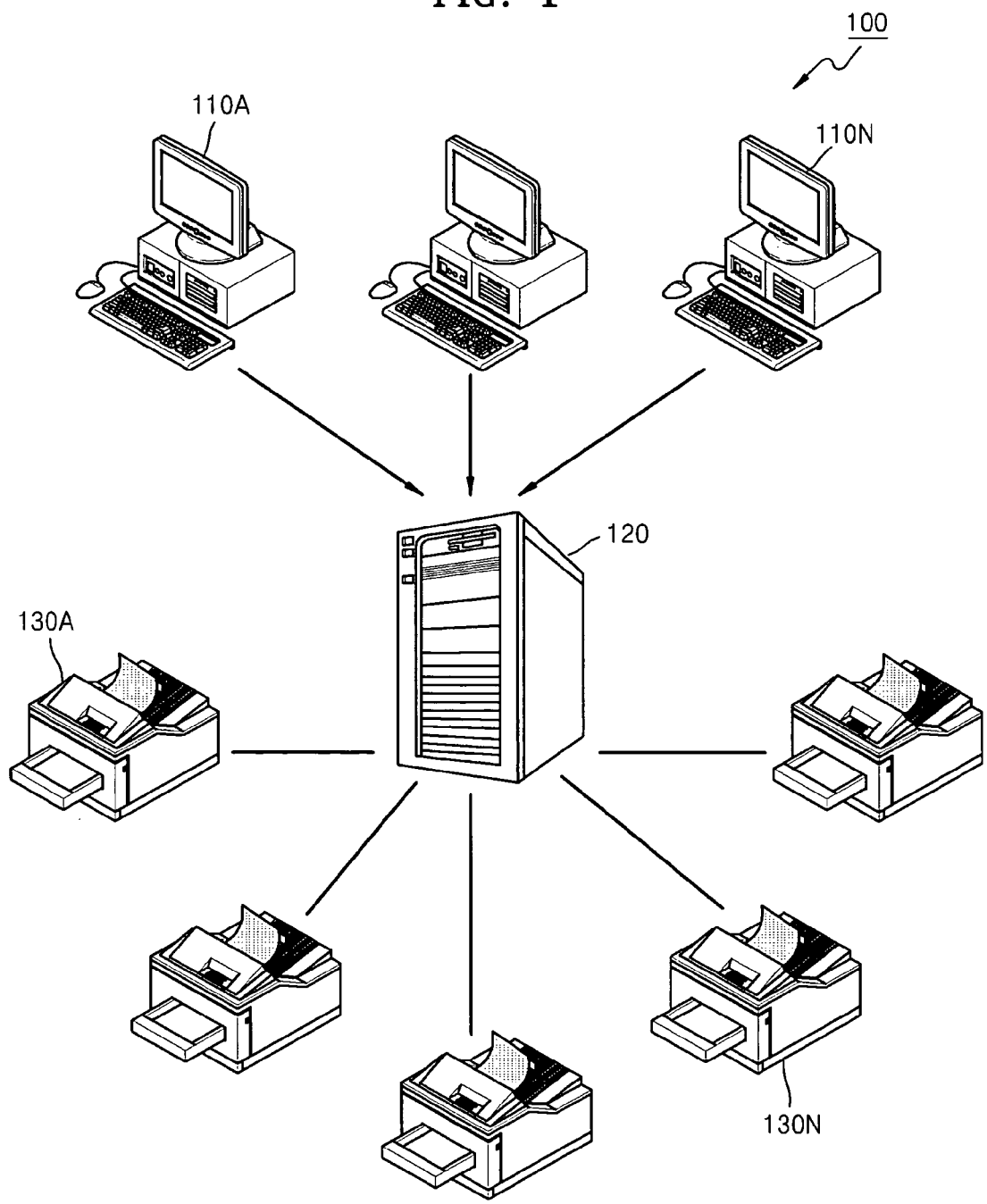
FIG. 1 is a diagram illustrating a configuration of a typical server-client environment.

Reference will now be made in detail to the example embodiments of the present invention, examples of which are illustrated in the accompanying drawings, wherein like reference numerals refer to the like elements throughout. The embodiments are described below in order to explain the present invention by referring to the figures.

Figure 2:
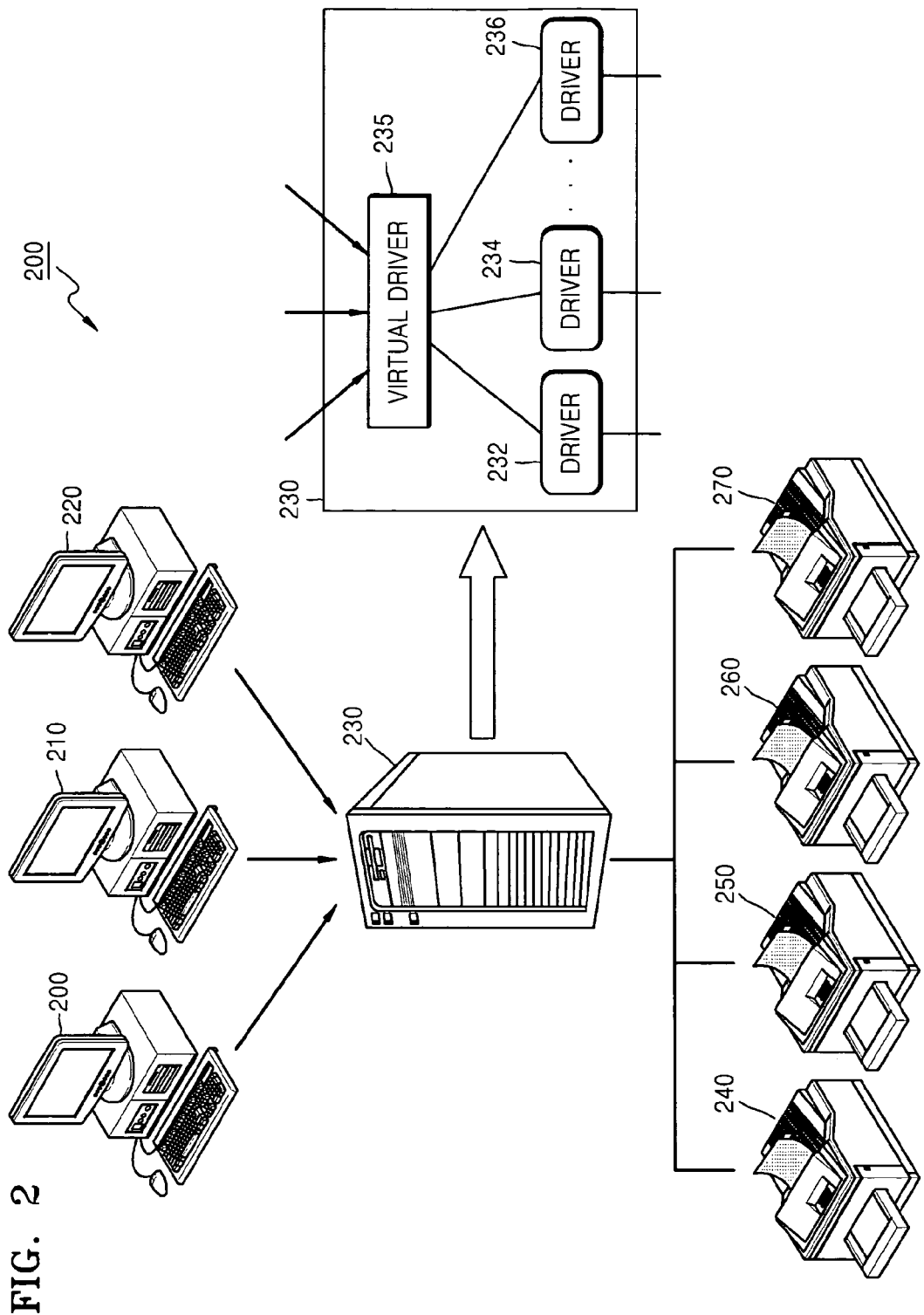
FIG. 2 is a diagram illustrating a network of a server-client environment according to an embodiment of the present invention.

FIG. 2 is a diagram illustrating a network of a server-client environment to which an embodiment of the present invention apply. The network includes a plurality of client devices 200, 210 and 220, a plurality of image forming devices such as printers 240, 250, 260 and 270, and a server device 230. A plurality of network printer drivers 232, 234 and 236, and a driver 235 are installed in the server device 230. For purposes of brevity, client devices 200, 210 and 220, and a server device 230 are described as client computers and a server computer respectively.

Figure 3:
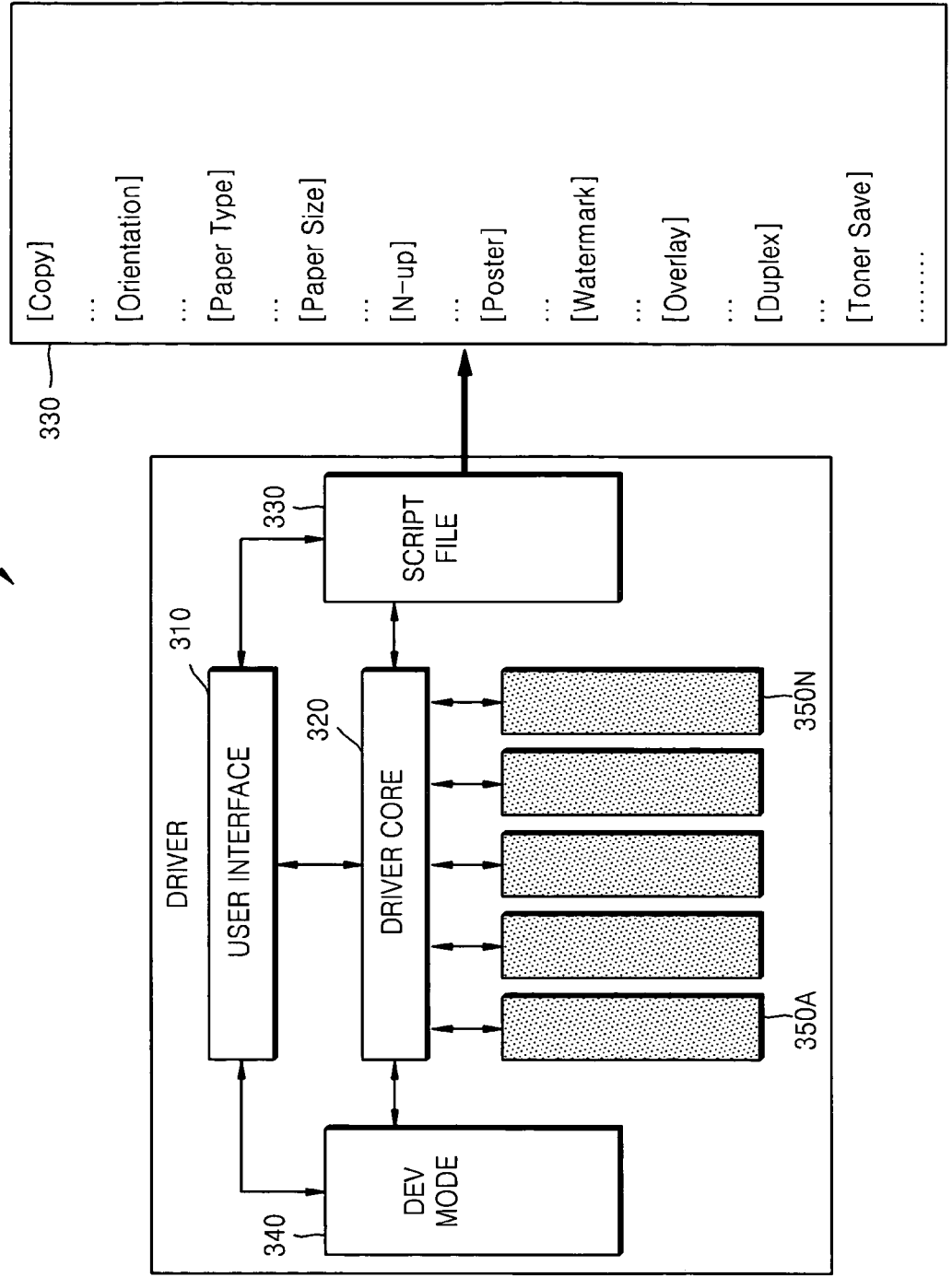
FIG. 3 is a block diagram of an image forming device driver according to an embodiment of the present invention.

Turning now to FIG. 3, a block diagram of an image forming device driver (e.g. a printer driver) according to an embodiment of the present invention is illustrated. As shown in FIG. 3, the image forming device driver 232, 234 or 236 includes a user interface 310, a driver core 320, a script file 330, a development mode 340 and multiple independent modules 350A-350N each using an object to perform a specific function.

In order to control printer drivers independently, specific functions of the printer driver are created as objects and the objects are installed as independent modules 350A-350N in the printer driver 232, 234 or 236. That is, the printer driver 232, 234 or 236 includes a common module for fundamental functions, and also includes independent modules for specific functions (e.g. N-UP, Watermark, Overlay, Poser, Duplex, Toner Save, etc.) of each printer independently. At this point, the printer driver 232, 234 or 236 does not include a unified module combining each detailed specific function but independent modules 350A-350N using objects. Thus, each object corresponding to the specific function can be independently recognized and configured in various kinds of print models. Moreover, detailed information of each of the objects in the printer driver 232, 234 or 236 is described in a script file format, and can be shared with another system or driver.

An operating system (OS) provides a structure that contains information about the initializations and functional settings for objects, such as monitors or printers that can output an image, among devices. All the devices can be controlled by setting fields in the structure. The structure provided by the OS is called DEVMODE.

A printer driver is roughly divided into two frameworks. One is a driver core and the other is a user interface. The driver core refers to a core source implementing printer settings such as orientation, paper type, paper size, and n-up.

All the printer settings are implemented by the core source and the implemented settings are displayed by the user interface by which a user can easily access the settings.

The user interface displays all the printer settings implemented by the deriver core (core source) in a dialogue so that the user can easily use all the settings. Here, the driver core and the user interface communicate with each other by means of the DEVMODE provided by the OS.

All the printer settings are implemented by the driver core, and the user can configure the settings using the user interface. Here, real settings are moved by the DEVMODE provided by the OS.

The printer settings depend on models. The driver core includes all the settings, and settings differing depending on models are controlled by a script file. That is, the script file is a text file that can set whether to apply all the settings provided by the driver core.

Figure 4:
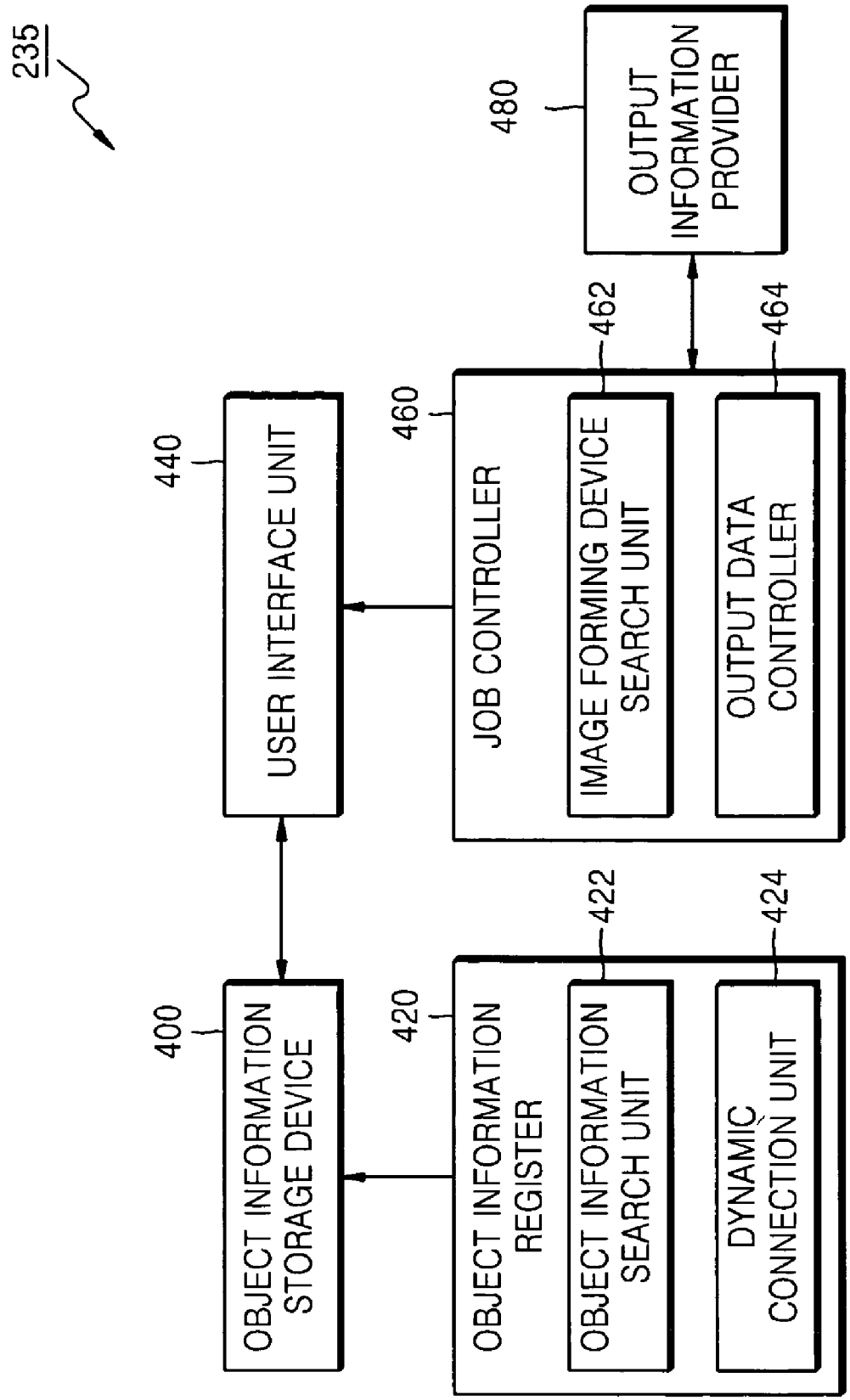
FIG. 4 is a block diagram of a virtual driver of a server device (server computer) managing a plurality of image forming device drivers according to an embodiment of the present invention.

FIG. 4 is a block diagram of a driver of a server device (server computer) managing a plurality of image forming device drivers according to an embodiment of the present invention. As shown in FIG. 4, the driver includes an object information storage part 400, an object information register 420, a user interface unit 440, and a job controller 460. Additionally, it is desirable that the virtual driver of the server device 235, as shown, for example, in FIG. 2, that manages the plurality of image forming device drivers 232, 234 and 236 further include a status information provider 480.

The object information storage part 400 stores printer information providing object information of the printer 240, 250, 260 or 270, as shown in FIG. 2, and the object. The object information of the object information storage device 400 can be configured in a script file form.

The object information register 420 recognizes a connection once the printer 240, 250, 260 or 270 is connected to the server computer 230, and then searches for the object stored in the object information storage part 400 and another new object. If there is a new object found, the object information register 420 registers the new object information and corresponding printer information in the object information storage part 400. The object information register 420 includes an object information search unit 422 and a dynamic connection unit 424. The object information search unit 422 recognizes a connection once the printer 240, 250, 260 or 270 is connected to the server computer 230 and then searches object information of the printer driver 232, 234 or 236. The dynamic connection unit 424 finds a new object in the search result and then stores corresponding printer information in the object information storage part 400.

The user interface unit 440 displays object information stored in the object information storage part 400 to allow a user to select a printer 240, 250, 260 or 270 with required functions through the user interface unit 440.

The job controller 460 allows the print data to be outputted to the printer 240, 250, 260 or 270 providing the object when an object is selected through the user interface unit 440. The job controller 460 includes an image forming device search unit 462 and an output data controller 464. The image forming device search unit 462 finds printers 240, 250, 260 or 270 providing the selected object by searching the object information storage device 400 when an object is selected through the user interface unit 440. The output data controller 464 assigns a printing job from the detected printers 240, 250, 260 and 270, and allows the assigned printer 240, 250, 260 or 270 to print the print data.

The output information provider 480 informs a client computer 230 about information of the printer 240, 250, 260 or 270 that outputs data. Information about the printer 240, 250, 260 or 270 of the output information provider 480 includes location information of the printer 240, 250, 260 or 270 and information about a progress status of the data output. That is, the client computer 200, 210 or 220 is informed of the location of the printer 240, 250, 260 or 270 that outputs the print data among a plurality of printers 240, 250, 260 and 270 connected to the server computer 230, and an output status of the current print data.

More specifically, as illustrated in FIG. 2, the server computer 230 connected to the network is connected to various kinds of printers 240, 250, 260 and 270. A driver 232, 234 or 236 is installed in each of the printers 240, 250, 260 and 270. At this point, various functions of each installed driver 232, 234 or 236 about a job distribution and an output are controlled through the virtual driver 235 of the server computer 230. On the other hand, the driver of each printer 240, 250, 260 and 270 connected to the server computer 230 is not directly installed on a local (each of the client computers 200, 210 and 220). Additionally, the client computers 200, 210 and 220 are granted with a usage authorization for all printers through the virtual driver 235 provided from the server computer 230.

To effectively provide respective specific functions of the printers 240, 250, 260 and 270 to the client computers 200, 210 and 220, as shown, for example, in FIG. 2, after searching object-processed functions included in drivers of printers connected and installed to server computer 230, recognizing newly added specific functions, and dynamically connecting corresponding objects to the virtual driver 235, the specific functions are displayed to the user.

Figure 5:
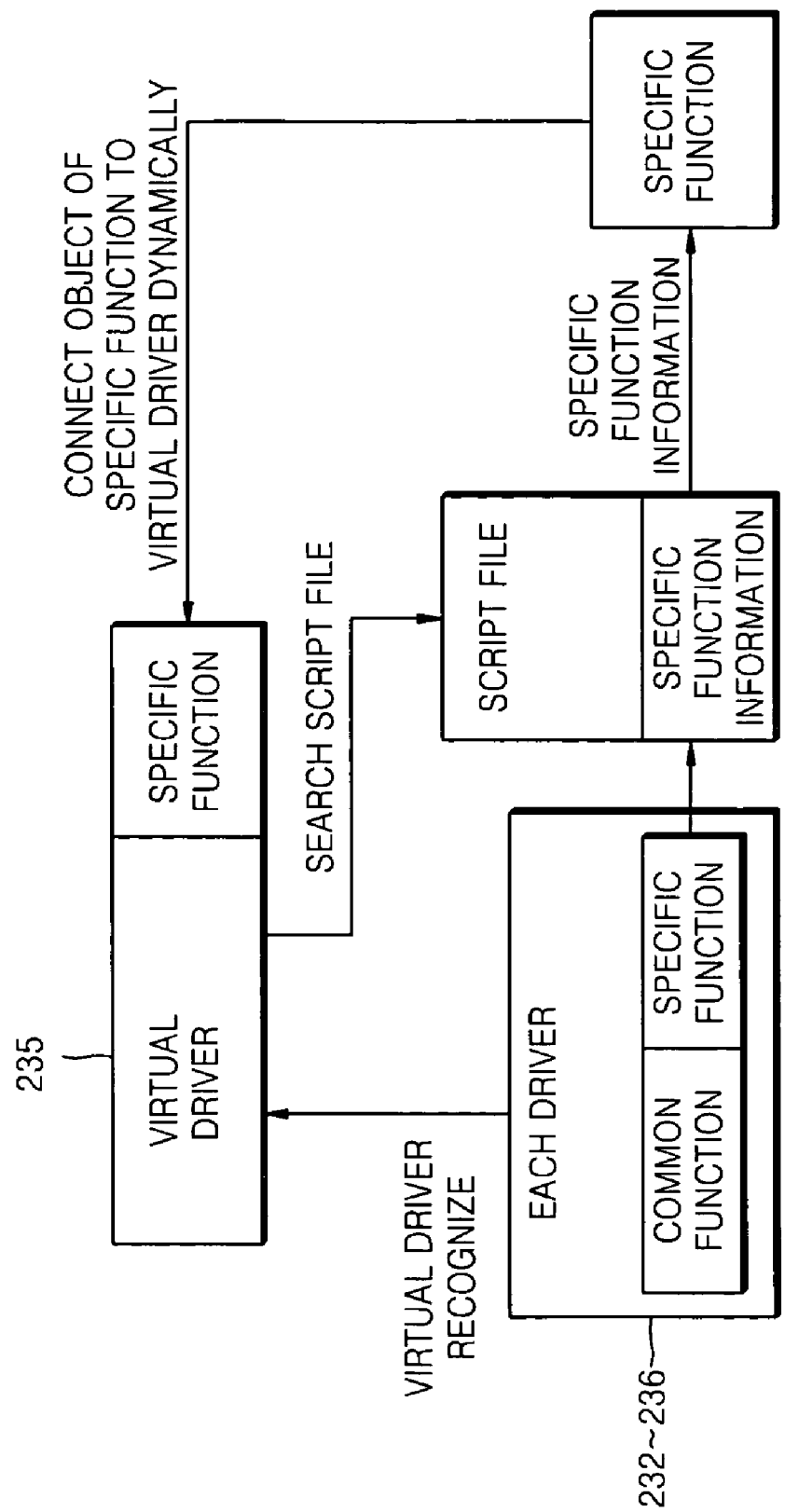
FIG. 5 is a fundamental conceptual diagram illustrating a data output method of a virtual driver according to an embodiment of the present invention.

FIG. 5 is a fundamental conceptual diagram for illustrating a data output method of a virtual driver according to an embodiment of the present invention. Referring to FIG. 5, object information in each printer driver 232, 234 and 236, as shown, for example, in FIG. 2, is provided in a file script file form, and another system or driver can access the information without restriction. A printer 240, 250, 260 or 270 is connected to a server computer 230 and new object information in a script file format is transferred to the virtual driver 235 when installed. At this point, a list of new functions (e.g. N-UP, Watermark, Overlay, Poser, Duplex, Toner Save, etc.) is searched to find the functions that are not included in the virtual driver 235 itself. Then, if there is specific function information after searching, the corresponding object information is connected dynamically to the virtual driver 235, and also an interface can be provided with the new object functions added to client computers 200, 210 and 220.

Figure 6:
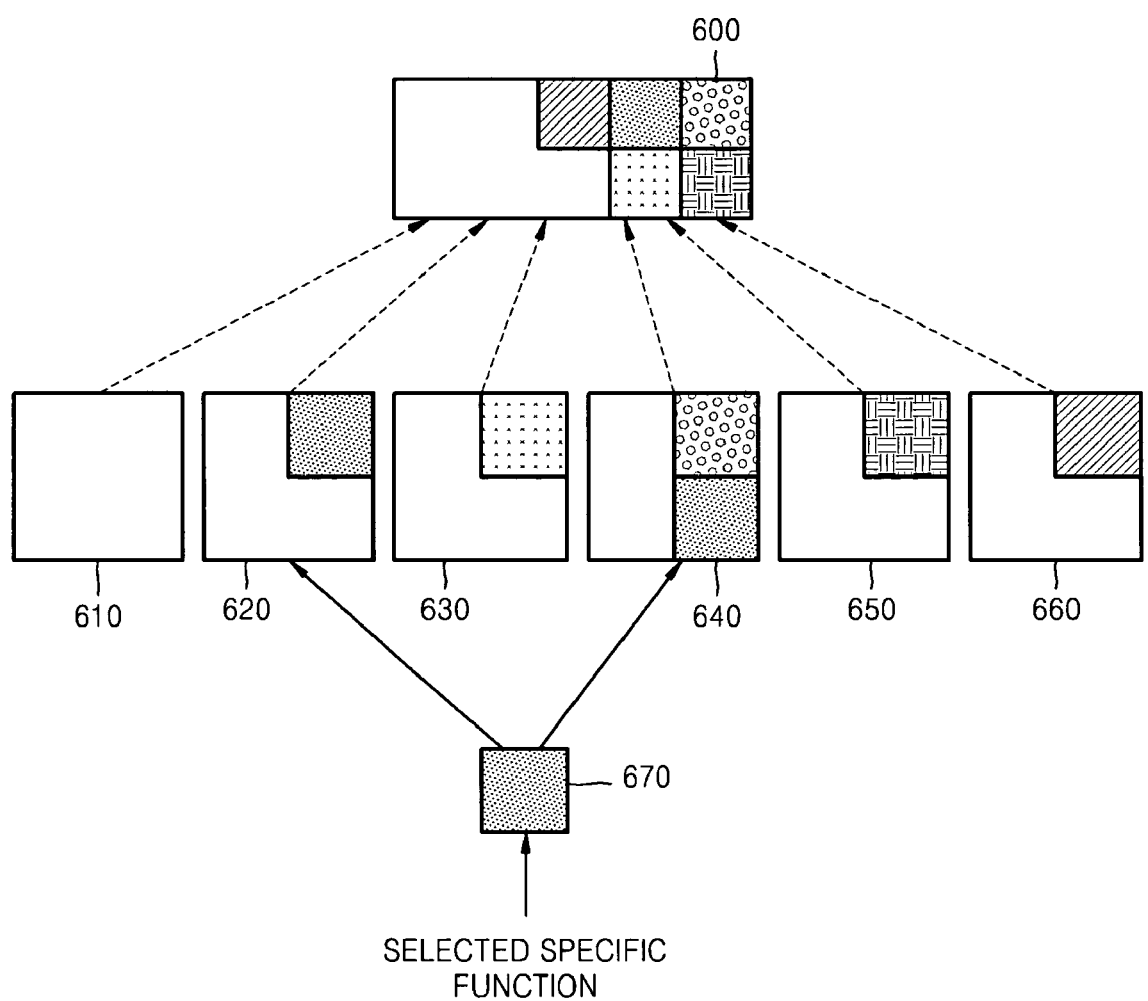
FIG. 6 is a diagram illustrating specific functions of each driver that is dynamically connected to a virtual driver.

FIG. 6 is a diagram illustrating specific functions of each driver that is dynamically connected to a driver 600. When a specific function is selected through a user interface unit 440, as shown, for example, in FIG. 4, a range of output printers is limited by the selected specific function. Referring to FIG. 6, it is possible that a client computer uses each specific function provided from the output printers. Additionally, the printers are connected to a server computer through the drivers 610, 620, 630, 640, 650, and 660 in which specific functions of each printer are dynamically added. At this point, the driver 600 generates drive location information of the output printers in which is the specific functions are included, and then uses the drive location information when printing. Moreover, the driver 600 assigns a job by limiting a range of output printers where this function can be performed using a selected specific object.

The user selects a specific object 670 registered in the interface of the driver to output, and then the job is performed. Then, a select range of printers outputting a job is determined by the driver 600. The printer outputting the job is automatically determined by referring to drive information of the source printers including each function object (e.g. N-UP, Watermark, Overlay, Poser, Duplex, Toner Save, etc.).

Figure 7:
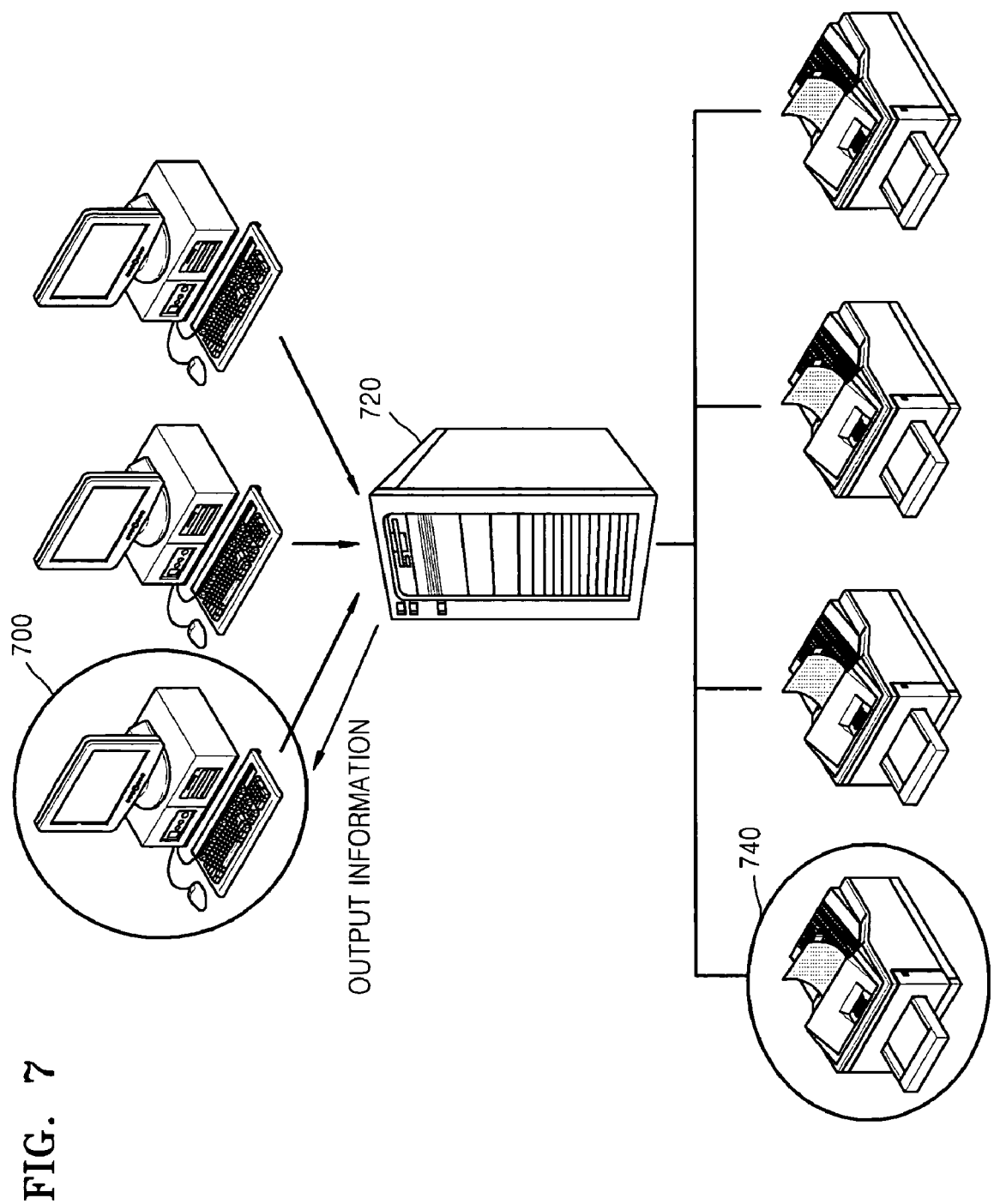
FIG. 7 is a diagram illustrating a process in which a client computer requests a print data output, a printer is selected through a virtual driver, and output data is transferred to the selected printer according to an embodiment of the present invention.

FIG. 7 is a diagram for illustrating a process whereby a client computer requests a print data output, a printer is selected through a driver, and output data is transferred to the selected printer. As illustrated in FIG. 7, a virtual driver (not shown) of a server computer 720 orders the selected printer, for example, printer 740, to output, and simultaneously informs a client computer 700, which requests a print data output, of information about the selected printer 740, such as location information and progress status information, etc. Consequently, the user can obtain documents easily.

Figure 8:
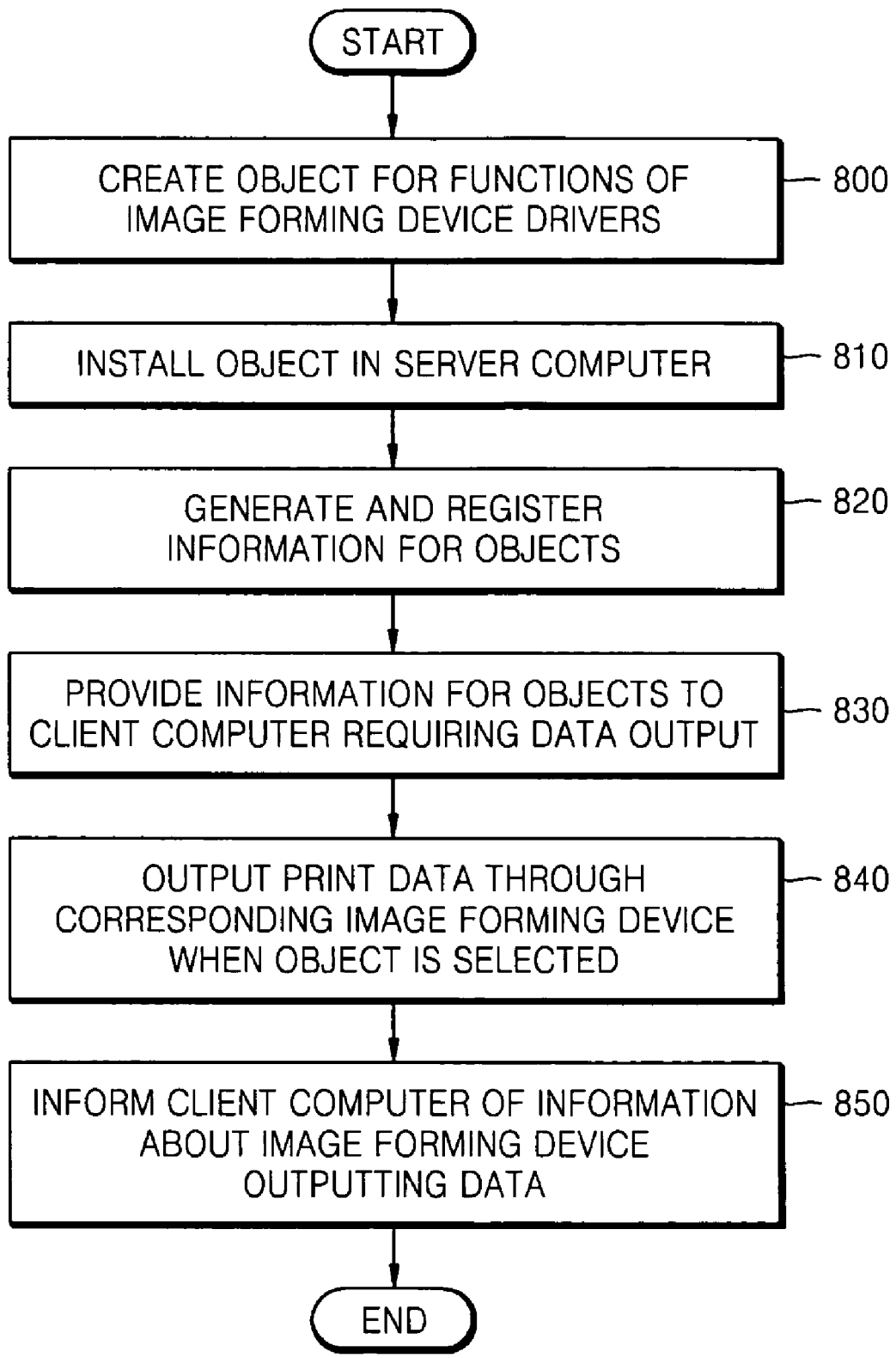
FIG. 8 is a flowchart illustrating a data output method of a virtual driver managing a plurality of image forming device drivers according to an embodiment of the present invention.

FIG. 8 is a flowchart illustrating a data output method of a virtual driver managing a plurality of printer drivers. First, in a server-client environment of the present invention, various kinds of printers are connected to a server computer in a network. Moreover, a driver of each printer is installed and operated in the server computer. The server computer controls each printer driver through virtual functions. Then, the output environment is provided to a client computer on the network through the virtual driver when printing.

Referring to FIG. 8, functions, which are provided from each of a plurality of image forming device (printer) drivers, become independent by creating an object for the functions at operation S800. The independent object information is provided in a script file format. Additionally, when a printer is connected to the server computer, the printer's driver is installed and then the object is installed to the server computer at operation S810.

Information for the installed objects is generated and registered at operation S820. FIG. 9 provides a detailed flowchart of operation 820 shown in FIG. 8. Referring to FIG. 9, the driver recognizes the newly installed printer driver at operation S900. Then, the object information of the recognized driver is searched at operation S920. Once the new object is found, the object is dynamically connected to the virtual driver installed in the server computer in operation S940. Thus, inefficiency, whereby only fundamental functions can be offered, can be eliminated through a dynamical object connection of the virtual driver. Consequently, an efficient output function can be provided to the user.

The corresponding image forming device (printer) information of the connected object is generated at operation S960. By doing this, the client computer can use all functions of the network printer drivers connected to the server computer.

If there is a client computer requiring the data output, information about the objects is provided to the client computers through the user interface of the virtual driver at operation S830. When the object is selected by the client computer, the virtual driver outputs print data through the corresponding image forming device (printer) that provides the objects at operation S840. That is, when the object is selected by the client computer, the virtual driver searches source printers that provide the object. When source printers are found, the print job is assigned by limiting the printers, and the print data is outputted according to functions of the objects selected through the assigned image forming device (printer).

Information about the image forming device (printer) that outputs data is generated and transferred to the client computer. Then, the information is given to the user of a message box display method at operation S850. By doing this, the client computer can share information about the actual printer by using information from the server computer. Moreover, information about the image forming device (printer) includes location information of the image forming device (printer) that prints actual documents, and progress status information of data output.

The present invention provides a driver that manages a plurality of image forming device (printer) drivers and a data output method. The driver allows users to use all functions provided from each of a plurality of printers and a network printer effectively by creating an object for an individual function of each printer driver, and adding dynamically different specific functions to each printer to be recognized in the virtual driver.

Additionally, reliability of products can be increased by allowing users to efficiently use all specific functions of printers provided from the server in the client-server environment on the network. Consequently, a usage efficiency of devices can be maximized.

Various components of the image forming device (printer) driver and the virtual driver, as shown in FIG. 3 and FIG. 4, can be integrated into a single control module, or alternatively, can be implemented in software or hardware, such as, for example, an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded, downloaded from a recording medium or the Internet, or alternatively, transported into the wireless cards or any computing devices on the wireless network. For example, code segments including instructions stored on floppy discs, CD or DVD media, a hard disk, or transported through a network interface card, modem, or other interface device may be loaded into the system and executed as corresponding software routines or modules.

In addition, the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or nonvolatile, such as semiconductor, magnetic, optical or other memory device. Furthermore, the software modules as described can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. A server that manages a plurality of image forming device drivers in a network where a plurality of image forming devices and at least one client are connected to a server, respectively, the server comprising:
    an object information storage part to store object information of objects respectively corresponding to functions of the plurality of image forming device drivers, and image forming device information to provide the objects;
    an object information register to register, in the object information storage part, different object information of a different object of a new image forming apparatus, the different object being different from the objects previously stored in the object information storage part, and corresponding image forming device information when the new image forming device is connected to the server and the different object is found by recognizing the connection and dynamically connect corresponding objects to a driver that allows users to use all functions provided from each of a plurality of image forming devices;
    a user interface unit to provide and display the object information and the different object information stored in the object information storage device to the client so that the users can select the object, when the client requests a data output; and
    a job controller to limit a range of the plurality of image forming devices where a certain function can be performed using a selected object and output print data to a selected image forming device of the plurality of image forming devices providing the selected object, in response to object information corresponding to the selected object being selected through the user interface unit,
    wherein the functions of the plurality of image forming device drivers include both fundamental functions common to the plurality of the image forming device drivers and specific functions that are specific to an individual one of the plurality of image forming device drivers, and each object corresponding to the specific function can be independently recognized by the user interface unit,
    wherein the object information register comprises:
        an object information search unit to search for the different object information when the new image forming device is connected to the server and is recognized; and
        a dynamic connection unit to register the different object information and the corresponding image forming device information when the different object is found in a search result.

2. The server of claim 1, wherein the object information of the objects in the object information storage part is in a script file format.

3. The server of claim 1, wherein the job controller comprises:
    an image forming device search unit to search for image forming devices, from among the plurality of image forming devices, that provide the selected object by searching the object information storage part, when the corresponding object information is selected through the user interface unit; and
    an output data controller to output the print data through the selected image forming device that is selected from among the searched image forming devices providing the selected object.

4. The server of claim 1, further comprising an output information provider to inform the client of information about the allocated image forming device.

5. The server of claim 4, wherein the information about the allocated image forming device comprises location information of the allocated image forming device and progress status information of a data output.

6. A data printing method of a driver managing a plurality of image forming device drivers in a network where a plurality of image forming devices and at least one client are connected to a server, the method comprising:
    creating objects respectively corresponding to functions of the image forming device drivers and installing the created objects in the server;
    creating and registering information about the installed objects, the registering including searching for object information of a recognized newly installed image forming device driver and dynamically connecting a different object to the driver installed in the server when the different object is found in the searching;
    providing the information about the installed objects to a client requesting an output of print data; and
    limiting a range of the plurality of image forming devices where a certain function can be performed using a selected object and printing the print data using a selected image forming device of the plurality of image forming devices providing an object from among the installed objects when the object is selected by the client,
    wherein the functions of the plurality of image forming device drivers include both fundamental functions common to the plurality of the image forming device drivers and specific functions that are specific to an individual one of the plurality of each image forming device drivers, and each object corresponding to the specific function can be independently recognized by the client,
    wherein the registering information comprises:
        searching for the different object information when the new image forming device is connected to the server and is recognized, and
        registering the different object information and the corresponding image forming device information when the different object is found in a search result.

7. The method of claim 6, wherein the information about the installed objects is configured in a script file format.

8. The method of claim 6, wherein the registering of the information further comprises:
    recognizing a newly installed image forming device driver; and creating corresponding image forming device information of the connected object.

9. The method of claim 8, wherein the providing of the information comprises:
    searching image forming devices providing the object when the object is selected by the client; and
    outputting the print data through the allocated image forming device that is allocated from among the searched image forming devices providing the selected object.

10. The method of claim 6, further comprising transferring information about the allocated image forming device to the client to inform a user of the client.

11. The method of claim 10, wherein the information about the allocated image forming device comprises location information of the allocated image forming device and progress status information of a data output.

12. A non-transitory computer readable medium having recorded thereon a program including computer-execution instructions for performing a method comprising:
    creating objects respectively corresponding to functions of image forming device drivers in a network where a plurality of image forming devices and at least one client are connected to a server, and installing the created objects in the server;
    creating and registering information about the installed objects the registering including searching for object information of a recognized newly installed image forming device driver and dynamically connecting a different object to the driver installed in the server when the different object is found in the searching;
    providing the information about the installed objects to a client requesting an output of print data; and
    limiting a range of the plurality of image forming devices where a certain function can be performed using a selected object and printing the print data using a selected image forming device of the plurality of image forming devices providing an object from among the installed objects when the object is selected by the client,
    wherein the functions of the plurality of image forming device drivers include fundamental functions common to the plurality of the image forming device drivers and specific functions of an individual one of the plurality of image forming device drivers, and each object corresponding to the specific function can be independently recognized by the client,
    wherein the registering information comprises:
        searching for the different object information when the new image forming device is connected to the server and is recognized, and
    registering the different object information and the corresponding image forming device information when the different object is found in a search result.

* * * * *